United States Patent [19]

Heemskerk et al.

[11] 4,386,811
[45] Jun. 7, 1983

[54] BALL BEARING

[75] Inventors: Rutgerus S. Heemskerk, Vianen; Hendrik v Engelenburg, Driebergen, both of Netherlands

[73] Assignee: SKF Industrial Trading & Development Co., Nieuwegein, Netherlands

[21] Appl. No.: 281,051

[22] Filed: Jul. 7, 1981

[30] Foreign Application Priority Data

Jul. 7, 1980 [NL] Netherlands ............... 8003921

[51] Int. Cl.$^3$ ............................................. F16C 33/38
[52] U.S. Cl. ............................................. 308/188; 308/201
[58] Field of Search ............ 308/188, 201, 189 R, 308/190, 193, 195, 6 B, 6 R

[56] References Cited

U.S. PATENT DOCUMENTS

| | | | |
|---|---|---|---|
| 3,003,830 | 10/1961 | Blazek | 308/6 B |
| 3,482,297 | 12/1969 | Vannest | 308/201 |
| 3,743,369 | 7/1973 | Langström | 308/201 |

*Primary Examiner*—Lenard A. Footland
*Attorney, Agent, or Firm*—Eugene E. Renz, Jr.

[57] ABSTRACT

A ball bearing having inner and outer race rings, a plurality of balls in the annular space between the race rings and a cage for circumferentially spacing the balls and spaced from the outer ring by a small radial clearance, the cage being formed by an annular member having a plurality of openings for the balls, each opening having a generally circular cylindrical wall with a longitudinal axis directed toward the center of the cage, the balls engaging in the openings with a small clearance, projections adjacent the inner circumferential edge of the cage directed inwardly from the cylindrical wall whereby when the cage is in contact with the outer race ring, the balls near this point of contact engage the projection producing a force directed in a circumferential direction, the balls engageable with the cylindrical circular wall producing a force which is directed generally radially outwardly to displace the cage towards the outer ring whereby the cage rotates eccentrically in a stable manner, and structure guiding the cage against displacement in an axial direction.

4 Claims, 3 Drawing Figures

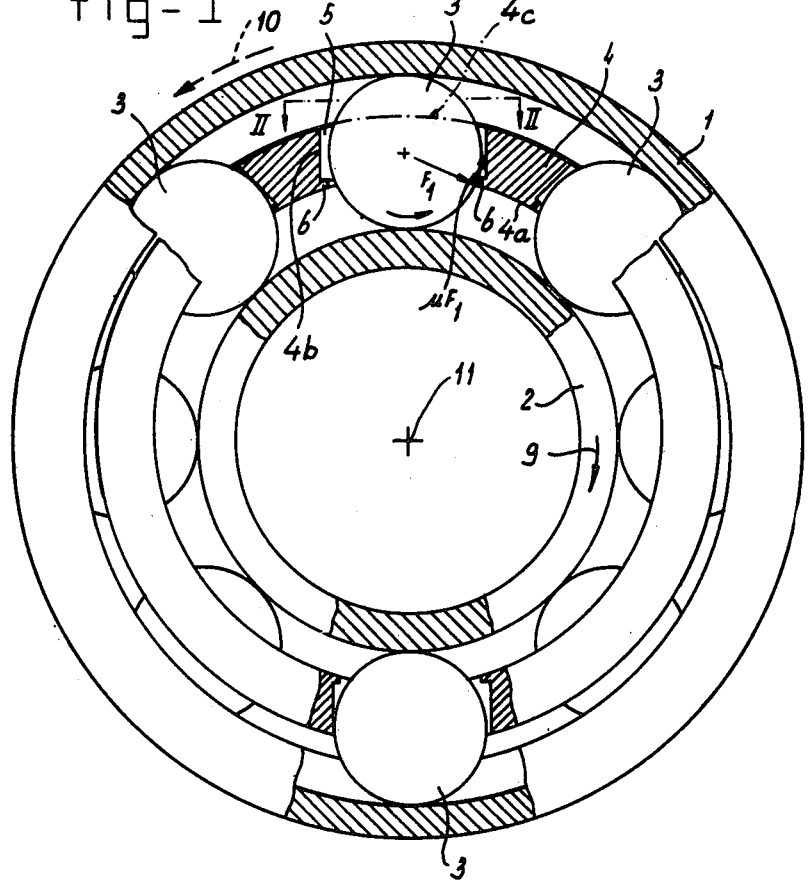

BALL BEARING

The invention concerns a ball bearing having a cage, which, with a small radial clearance, is situated within the outer race and which is formed by an annular member wherein a plurality of openings are made at equal distances apart, each of which is essentially limited by a circular cylindrical wall, the longitudinal axis of which is directed toward the center of the cage, in which openings the balls of the bearing are accommodated with a small clearance.

In a ball bearing of this type the cage, in operation, must travel along eccentrically, in other words, the cage, carried along by the balls, rotates at one and the same point, in contact with the outer race, along this race. At very high speeds of rotation, for example in the order of magnitude of $10^4$–$10^5$ rpm, however, instability of the cage often occurs, i.e., the point of contact of the cage with the outer race suddenly changes, as a result of which phenomenon the ball bearing may collapse as a consequence of the resultant impact stresses between balls and cage.

To prevent such instability, it has previously been proposed, pursuant to British Pat. No. 1,481,888, that the cage be designed such that it has a center of gravity located eccentrically relative to the center of the bearing. At very high speeds of rotation, however, undesirable dynamic loads of the bearing are thereby obtained.

The object of the invention is to procure a ball bearing, of the type mentioned, in which this disadvantage cannot occur.

This object is obtained in that in the ball bearing pursuant to the invention, in each opening of the cage, near the inner circumference thereof and at least near the intersection of the wall of the opening with the surface perpendicular to the axis of rotation and through the center of the cage, one or a plurality of projections, directed inward from the wall, are formed in such a way that when the cage is in contact with the outer race the balls near this point of contact are pressed against the projections.

In this way, when the cage has come into contact with the outer race, at least the ball lying closest to the point of contact will come into contact with the projections, whereby the force resulting from the compressive force between ball and projections and the frictional force thereby produced is directed essentially in the circumferential direction of the cage, while if the cage is removed from the point of contact by an external force the ball is no longer in contact with the projections, owing to which the force resulting from the forces then occurring is directed essentially radially inward, as a result of which the cage is again driven into contact with the outer race at the same point.

The projections may be formed by steps, projecting inward, in the cylindrical wall of each opening.

It is advantageous if the steps run around along the entire cylindrical wall, with the exception of two diametrically opposed segments of the wall, through the center of which the plane of symmetry runs perpendicular to the axis of rotation of the cage. In this way an axial guide for the cage is at the same time obtained.

The steps are preferably formed along the inner edge of each opening.

The invention is described in greater detail with reference to the drawing, in which:

FIG. 1 represents a view of a ball bearing in operation pursuant to the invention with cut-away parts and clearances exaggerated for the sake of clarity, FIG. 2 is a view along the arrows II in FIG. 1, and FIG. 3 represents the uppermost ball of FIG. 1, in the case of possible occurrence of an external force acting on the cage.

As represented, the bearing pursuant to the invention comprises an outer race 1 and an inner race 2 with a plurality of balls 3 situated between these races, which balls are separated in relation to one another in a cage 4, which cage lies with a clearance, represented exaggerated in the figure, in the outer race 1. The cage 4 consists of an annular member in which openings 5 are formed by a circular cylindrical wall 4b. In each opening 5 is accommodated a ball 3 with a clearance shown exaggerated in the figure.

In the cylindrical wall 4b of each opening 5 a stepped projection 6 is formed near the inner edge of the opening 5. The stepped projection runs along the entire inner circumference of the cylindrical wall 4b with the exception of segments 7 (see FIG. 2), where the steps 6 are interrupted. The segments 7 lie diametrically opposed, while the intersection 8 with the plane of symmetry runs perpendicular to the axis of rotation of the cage 4 through the center of these segments 7.

In operation, the cage 4, for example at a point 4c near the ball 3', shown uppermost in FIG. 1, will come into contact with the outer race 1, as a result of which the ball 3' comes to press against the projection 6 and the force of reaction $F_1$ is produced, with the corresponding frictional force $uF_1$, while, in the case that the inner race is in connection with a driven member, as indicated by the arrow 9, mainly the ball 3' will carry the cage along, since the point of contact 4c between the cage 4 and the outer race 1 lies near this ball. The force resulting from the force $F_1$ and the frictional force $uF_1$ thereby generated is directed essentially in the circumferential direction of the cage 4, and overcomes the frictional force between cage 4 and outer race 1.

If, owing to one or another external force, the cage 4 is removed from the point of contact 4c with the outer race, the ball 3' loses contact with the projection 6, and comes into contact exclusively with the cylindrical wall of the opening 5 (see FIG. 3), resulting in production of the forces $F_2$ and $uF_2$, the resultant force of which is directed essentially radially outward, so that the cage 4 is at the same point again moved back into contact with the outer race.

In this way the cage will rotate along eccentrically in a stable manner. Only by an external force acting on the cage that is capable of overcoming the force resulting from $F_2$ and $uF_2$ will the point of contact 4c of the cage permanently leave the outer race and assume another point of contact, after which, owing to the forces then appearing on the ball situated near the new point of contact, the new point of contact is permanently maintained.

Owing to the parts of the stepped projection 6 omitted at 7, the cage 4 is at the same time guided against displacement in axial direction.

In FIG. 1 the arrow 10 indicates the direction of rotation of the outer race 1 if this race is in connection with a driven member and the inner race 2 stands still, in which case the cage has a speed of rotation which is smaller than that of the outer race, so that then, too, the forces are generated as described above, while, however, the cage presses against the balls.

What is claimed is:

1. A ball bearing having inner and outer race rings, a plurality of balls in the annular space between the race rings and a cage for circumferentially spacing the balls and spaced from the outer ring by a small radial clearance, said cage being formed by an annular member having a plurality of openings for the balls, each opening having a generally circular cylindrical wall with a longitudinal axis directed toward the center of the cage, said balls engaging in the openings with a small clearance, projection means adjacent the inner circumferential edge of the cage directed inwardly from said cylindrical wall whereby when the cage is in contact with the outer race ring, the balls near this point of contact engage the projections producing a force directed in a circumferential direction, said balls engageable with the cylindrical circular wall producing a force which is directed generally radially outwardly to displace the cage towards the outer ring whereby the cage rotates eccentrically in a stable manner and means guiding the cage against displacement in an axial direction.

2. A ball bearing according to claim 1 wherein said projection means are in the form of steps projecting inward in the cylindrical wall of each opening.

3. A ball bearing as claimed in claim 2 wherein said steps extend around the entire cylindrical wall with the exception of two diametrically opposed segments located extending through the center of the plane of symmetry running perpendicular to the axis of rotation of the cage.

4. A ball bearing as claimed in claim 2 wherein the steps are formed along the inner edge of each opening.

* * * * *